Patented Apr. 27, 1954

2,676,967

UNITED STATES PATENT OFFICE 2,676,967

PYRIDINE DERIVATIVES

John Thomas Plati, Passaic, and Wilhelm Wenner, Montclair, N. J., assignors to Hoffmann-La Roche Inc., Nutley, N. J., a corporation of New Jersey No Drawing. Application September 27, 1950, Serial No. 187,156

8 Claims. (Cl. 260—290)

This invention relates to 3 - methyl-2,4 - diphenyl-pyridine and derivatives thereof in which the phenyl radicals are substituted, as for example, by a member of the group consisting of halogen, lower alkoxy and lower alkyl radicals. The invention also embraces the acid addition salts and the corresponding quaternary ammonium derivatives of the new compounds and the method for producing said new compounds. The new 3-methyl-2,4-diphenyl-pyridines are useful in the field of pharmaceuticals, and more particularly anthelmintics.

When 1 - methyl - 3 - benzoyl - 4 - hydroxy - 4-phenyl-piperidine is reacted with excess acetic anhydride at low temperatures, for example, below about 50° C., in the presence or absence of a small amount of sulfuric acid as an acetylating catalyst, 1-methyl-3-benzoyl-4-phenyl-4-acetoxy-piperidine is obtained. This can be distilled without decomposition in the presence of a small amount of potassium carbonate.

When the reaction with the acetic anhydride is carried out at 50-100° C., as for example, on a steam or water bath, there can be isolated from the reaction mixture, in about 15% yield, 1 - methyl - 3 - benzoyl - 4 - phenyl - 1,2,5,6 - tetrahydropyridine which is claimed in our application Ser. No. 103,752 filed July 8, 1949, U. S. Patent No. 2,537,854, granted January 9, 1951.

We have now found that if the reaction mixture obtained when the reaction with acetic anhydride is carried out at 50–100° C. is further heated at temperatures above 100° C. and preferably within the range of about 120–170° C., an unexpected reaction takes place with the formation of the new compound, 3-methyl-2,4-diphenyl-pyridine. The same compound was also obtained when the reaction was carried out with other 1 - lower alkyl - 3 - benzoyl - 4 - hydroxy - 4-phenyl-piperidines, as 1-ethyl-3-benzoyl-4-hydroxy-4-phenyl-piperidine.

In a preferred procedure for preparing the 3-methyl-2,4-diphenyl-pyridine, the mixture of 1-methyl - 3 - benzoyl - 4 - hydroxy - 4 - phenyl - piperidine and excess acetic anhydride, in the presence or absence of a small (catalytic) amount of sulfuric acid, is reacted on a steam bath, and the excess acetic anhydride and the acetic acid formed during the reaction are removed in vacuo by gradually raising the temperature of the reaction mixture to about 90–100° C. The residual reaction mixture is then heated in vacuo by gradually increasing the temperature until the 3-methyl-2,4-diphenyl-pyridine distills over. During the heating an evolution of gas occurs at about 120–170° C., and when this has subsided, the heating is continued to distill the 3-methyl-2,4-diphenyl-pyridine. By proceeding in this manner, the desired compound is obtained in a highly purified state.

When 1-lower alkyl-3-benzoyl-4-hydroxy-4-phenyl-piperidines substituted in the phenyl radicals by halogen, alkoxy or lower alkyl groups are employed in the process, there are obtained the corresponding 3-methyl-2,4-diphenyl-pyridines substituted in the phenyl radicals by the aforesaid groups.

The new compounds of our invention are normally obtained as solids. They are soluble in the common organic solvents, but are insoluble in water, and act as weak bases. They can be distilled without decomposition in vacuo. The compounds readily form salts with acids, e. g., hydrochloric acid, hydrobromic acid, nitric acid, oxalic and picric acid. The salts are stable in the dry state but in solution show a tendency to hydrolyze due to the weak basic properties of the pyridine bases. Upon treatment with quaternizing agents, e. g., lower alkyl halides, sulfates, p-toluenesulfonate, etc., the new pyridine bases are readily converted to the corresponding quaternary ammonium compounds.

The following examples will serve to illustrate the invention:

Example 1

A mixture of 500 g. of 1-methyl-3-benzoyl-4-hydroxy-4-phenyl-piperidine, 2500 cc. of acetic anhydride, and 2 cc. of 95% sulfuric acid was warmed on a steam bath for 2½ hours. The excess acetic anhydride together with the acetic acid formed during the reaction was distilled off in a vacuum of about 20 mm., the temperature of the reaction mixture being gradually raised to about 95° C. The residual reaction mixture was then distilled in a vacuum of about 0.1–0.3 mm. by gradually increasing the temperature. Evolution of gas occurred, and when the evolution had subsided, heating with gradual increase of temperature was continued. An oil distilled over at 180–195° C./1.3 mm. Upon cooling, it solidified. The solid was 3-methyl-2,4-diphenyl-pyridine.

The hydrobromide of 3-methyl-2,4-diphenyl-pyridine was prepared by dissolving the base in 976 cc. of 48% hydrobromic acid at 50–60° C., and pouring the solution into 2 liters of water. The hydrobromide separated in crystalline form and melted at 238–241° C. after crystallization from alcohol.

An ethereal solution of oxalic acid was added to 3-methyl-2,4-diphenyl-pyridine until no further precipitate was formed. The oxalate of 3-methyl-2,4-diphenyl-pyridine was thus obtained as a crystalline powder. After recrystallization from ethanol it melted at 173–175° C.

When the hydrobromide, or oxalate of 3-methyl-2,4-diphenyl-pyridine was treated with aqueous sodium hydroxide followed by distillation and crystallization from dilute alcohol, pure 3-methyl-2,4-diphenyl-pyridine, M. P. 60–61° C., was obtained.

40 grams of 3-methyl-2,4-diphenyl-pyridine were dissolved in 80 cc. of ethanol. The mixture was cooled to about 20–25° C. and about 10.5 cc. of 70% nitric acid were slowly added. On standing and occasional scratching, 3-methyl-2,4-diphenyl-pyridine nitrate crystallized. The compound was filtered and washed with ethanol. It melted at 166–169° C.

The hydrochloride obtained by treating the free base in ether with alcoholic hydrochloric acid melted at 219–226° C.

10 grams of 3-methyl-2,4-diphenyl-pyridine and 10 cc. of methyl iodide in 100 cc. of benzene were allowed to stand for 120 hours. A precipitate formed which was the methiodide of 3-methyl-2,4-diphenyl-pyridine, M. P. 221° C., with some softening at about 214° C. The corresponding 1,3 - dimethyl - 2,4 - diphenyl - pyridinium chloride was prepared by treating the methiodide with silver chloride. It melts at 191–192° C.

Example 2

200 grams of 1-methyl-3-benzoyl-4-hydroxy-4-phenyl-piperidine and 1,000 cc. of acetic anhydride were heated on the steam bath for 2½ hours. The acetic acid which formed and the excess acetic anhydride were removed in a vacuum of about 20–30 mm. at a bath temperature which was raised gradually from initially about 40–50° C. to a temperature of about 90° C. The residue was transferred to a vacuum distilling flask. Heating in a vacuum of 20–30 mm. was continued until the bath temperature had reached about 170° C. During this time, evolution of gaseous products occurred. When the evolution of gas had subsided, the remaining product in the distilling flask was fractionated in a high vacuum of about 1.3 mm. In this manner, a fraction boiling at 180–195° C. at 1.3 mm. pressure was obtained as a viscous oil. It was treated with 330 cc. of 48% hydrobromic acid at about 60–80° C. The mixture was diluted with one liter of water of 25° C. The thus obtained 3-methyl-2,4-diphenyl-pyridine hydrobromide was filtered. Recrystallization from ethanol gave the pure hydrobromide which was identical with the hydrobromide obtained in Example 1.

Example 3

58 grams of 1-ethyl-3-benzoyl-4-hydroxy-4-phenyl-piperidine, 290 cc. of acetic anhydride, and 0.2 cc. of 95% sulfuric acid were warmed to 50–60° C. for 3 hours. The reaction mixture was subjected to distillation in a vacuum at about 20 mm. on a water bath. The residue was then heated by gradually increasing the temperature in a vacuum of 0.1–0.2 mm. At about 140–160° C. evolution of gas occurred. When the evolution of gas had subsided, the heating was continued. An oil of boiling point 185–200° C./0.9 mm. distilled over. The oil was dissolved in ether and an ethereal solution of oxalic acid was added until no further precipitation occurred. The precipitate was filtered and crystallized from alcohol, yielding the oxalate of 3-methyl-2,4-diphenyl-pyridine. From the oxalate the free base was obtained by addition of sodium hydroxide. It melted at 60° C. The hydrobromide melted at 238–241° C. and the hydrochloride melted at 219–226° C. Both salts and the free base were identical with the base and corresponding salts obtained as in Example 1.

Example 4

50 grams of 1-methyl-3-p-chlorobenzoyl-4-hydroxy-4-p-chlorophenyl-piperidine were heated on a steam bath for 2½ hours with 250 cc. acetic anhydride and 0.1 cc. of 95% sulfuric acid. The reaction mixture was distilled in a vacuum at 20 mm. on a water bath and the residue was distilled in a vacuum of 0.1–0.2 mm. by gradually raising the temperature. An oil distilled over at 205–210° C./0.5 mm. The oil solidified upon cooling. After recrystallization of the solid from methanol, there was obtained pure 3-methyl-2,4-di-(p-chlorophenyl)-pyridine, M. P. 136–139° C.

Example 5

136 grams of 1-methyl-3-m-methoxybenzoyl-4-hydroxy-4-m-methoxyphenyl-piperidine, 670 cc. of acetic anhydride, and 0.25 cc. of 95% sulfuric acid were heated for 2½ hours on the steam bath. The reaction mixture was distilled in a vacuum of 25–30 mm. on a water bath. The residue was then distilled in a vacuum of 0.1–0.2 mm. by gradually increasing the temperature. An oil distilled over at 245–250° C./1.5 mm. The oil thus obtained was 3-methyl-2,4-di-(m-methoxyphenyl)-pyridine. 40 grams of the free base were dissolved in 200 cc. of ether. An ethereal solution of picric acid was added until no further precipitation occurred. The precipitate was 3-methyl-2,4-di-(m-methoxyphenyl)-pyridine picrate, M. P. 104–105° C.

Example 6

100 grams of 1-methyl-3-(p-toluyl)-4-hydroxy-4-(p-tolyl)-pyridine, 500 cc. of acetic anhydride, and 0.3 cc. of 95% sulfuric acid were warmed on the steam bath for about 2½ hours with occasional shaking. The reaction mixture was distilled at a vacuum of about 20–30 mm. until the vapor temperature reached 150° C. A noticeable evolution of volatile material occurred during the distillation. After the evolution had subsided, the residue was distilled under a vacuum of about 0.5–1 mm. by gradually increasing the temperature. Most of the material distilled as a viscous oil at 200–210° C./0.65 mm. Upon cooling, the oil solidified. Recrystallization from methanol yielded pure 3-methyl-2,4-di-(p-tolyl)-pyridine of M. P. 102–104° C.

The 3-methyl-2,4-diphenyl-pyridine can be readily hydrogenated to form 3-methyl-2,4-diphenyl-piperidine. The following examples will illustrate the method of carrying out the hydrogenation procedure.

Example 7

A mixture of 1.23 grams of 3-methyl-2,4-diphenyl-pyridine, 0.20 gram of platinum oxide catalyst, 15 cc. of N hydrochloric acid, and 165 cc. of ethanol was hydrogenated at room temperature during a period of 1.5 hours and then at 55° C. for 5.5 hours with hydrogen at a pressure of about 50 pounds per square inch. After removal of the catalyst and evaporation of the solvent the residue was dissolved in 15 cc. of water and 25 cc. of acetone. The mixture was made alkaline with 5 cc. of 10% sodium hydroxide and then treated alternately with p-nitrobenzoyl chloride and 10% sodium hydroxide. In this manner 3.0 grams of p-nitrobenzoyl chloride and 7 cc. of 10% sodium hydroxide were utilized. The mixture was evaporated to dryness and the residue was extracted with dilute hydrochloric acid and ether. The ether solution was evaporated to dryness and the residue was digested with petroleum ether. In this manner 1-p-nitrobenzoyl-2,4-diphenyl-3-methyl-piperidine was obtained. On crystallization from ethanol the compound melted at 151–153° C.

*Example 8*

A mixture of 24.5 grams of 3-methyl-2,4-diphenyl-pyridine and 18.6 grams of methyl p-toluenesulfonate was heated for 15 minutes at 160° C. The resulting 1,3-dimethyl-2,4-diphenyl-pyridinium-p-toluenesulfonate was dissolved in 160 cc. of ethanol and the solution was hydrogenated in the presence of one gram of platinum oxide catalyst and at about 50 lb. hydrogen pressure for about 2 hours and at about 50–70° C. Fresh charges of the catalyst were added in order to increase the rate of hydrogen absorption during a total period of about 10 hours. After filtering off the catalyst, the solution was treated with dilute sodium hydroxide and allowed to crystallize for about 16 hours. In this manner an almost pure 1,3-dimethyl-2,4-diphenyl-piperidine was obtained. Upon crystallization from alcohol the compound melted at 101–103° C. The hydrochloride obtained by treating the free base with alcoholic hydrochloric acid followed by crystallization from ethanol melted at 256–258° C.

We claim:

1. The process which comprises reacting a compound of the group consisting of a 1-lower alkyl-3-benzoyl-4-hyroxy-4-phenyl-piperidine, a 1-lower alkyl-3-halobenzoyl-4-hydroxy-4-halophenyl-piperidine, a 1-lower alkyl-3-lower alkoxybenzoyl-4-hydroxy-4-lower alkoxyphenyl-piperidine, and a 1-lower alkyl-3-lower alkylbenzoyl-4-hydroxy-4-lower alkylphenyl-piperidine with excess acetic anhydride at a temperature not exceeding 100° C., and then heating the reaction mixture to a temperature within the range of about 120°–170° C. to produce respectively a compound of the group consisting of 3-methyl-2,4-diphenyl-pyridine, 3-methyl-2,4-di-(halophenyl)-pyridine, 3-methyl-2,4-di-(lower alkoxyphenyl)-pyridine, and 3-methyl-2,4-di-(lower alkylphenyl)-pyridine.

2. The process in accordance with claim 1, wherein the reaction with excess acetic anhydride is carried out in the presence of a small amount of sulfuric acid as a catalyst.

3. The process in accordance with claim 1, wherein acetic acid formed in the reaction at the temperature not exceeding 100° C. and the excess acetic anhydride are removed in vacuo, and the residual reaction mixture is heated in a vacuum by gradually increasing the temperature to produce and distill 3-methyl-2,4-diphenyl-pyridine.

4. A process according to claim 1, wherein the starting material is 1-methyl-3-benzoyl-4-hydroxy-4-phenyl-piperidine.

5. A process according to claim 1, wherein the starting material is 1-ethyl-3-benzoyl-4-hydroxy-4-phenyl-piperidine.

6. A process according to claim 1, wherein the starting material is 1-methyl-3-p-chlorobenzoyl-4-hydroxy-4-p-chlorophenyl-piperidine.

7. A process according to claim 1, wherein the starting material is 1-methyl-3-m-methoxybenzoyl-4-hydroxy-4-m-methoxyphenyl-piperidine.

8. A process according to claim 1, wherein the starting material is 1-methyl-3-p-toluyl-4-hydroxy-4-p-tolyl-piperidine.

References Cited in the file of this patent

UNITED STATES PATENTS

| Number | Name | Date |
|---|---|---|
| 2,549,651 | Weisberger | Apr. 17, 1951 |

OTHER REFERENCES

Gastaldi, "Chemical Abstracts," vol. 16 (1922), pp. 2689 and 2515.

Maier-Bode, "Pyridine and seine derivate" (1934), pp. 67, 69.